March 28, 1939.  W. P. MacMICKING  2,152,355
DIRECTION INDICATOR FOR VEHICLES
Filed Oct. 24, 1936
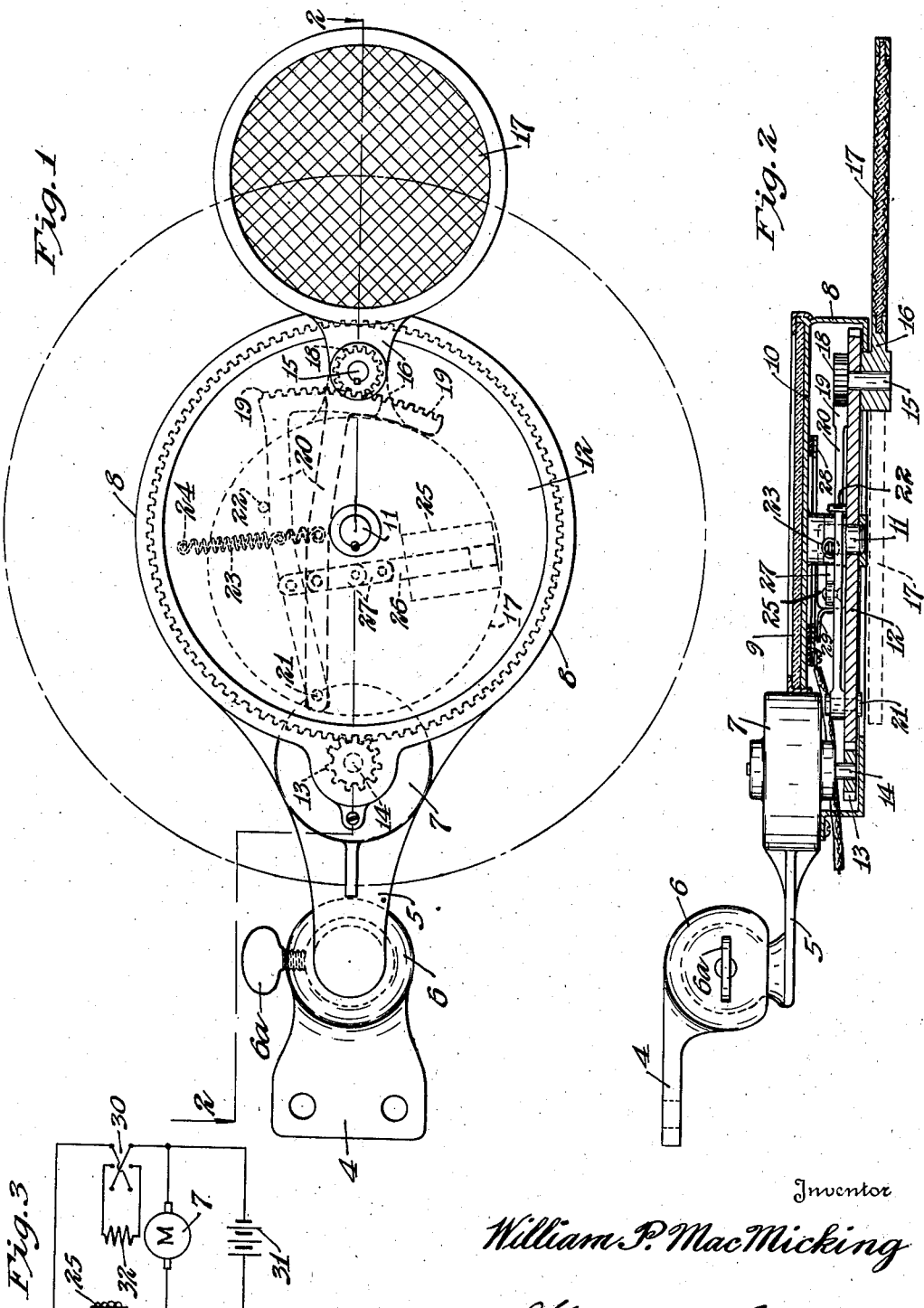
Inventor
William P. MacMicking
By Stryker & Stryker
Attorneys Patented Mar. 28, 1939

2,152,355

UNITED STATES PATENT OFFICE 2,152,355

DIRECTION INDICATOR FOR VEHICLES

William P. MacMicking, St. Paul, Minn.

Application October 24, 1936, Serial No. 107,431

7 Claims. (Cl. 177—327)

It is an object of this invention to provide a novel signal for motor vehicles adapted to indicate in a more conspicuous and easily understood manner the intention of the driver to turn to the right or left.

A particular object is to provide a power actuated signal under control of the driver of the vehicle whereby changes in direction are indicated by a continuously moving signal, the direction of rotation around a central casing indicating the direction of the turn.

Other objects will appear and be more fully pointed out in the following specification and claims.

Referring to the drawing,

Figure 1 is a front elevation of my improved direction indicator with the signal proper extended in its operative position;

Fig. 2 is a part plan view and part section through the casing and gears taken on the line 2—2 of Fig. 1, and Fig. 3 is a diagrammatic view illustrating suitable circuits under control of a three-way switch for operating the signal.

Referring to the drawing, the numeral 4 indicates a bracket for attaching the device to the side of a vehicle. This bracket is preferably secured to the left side in such position that the signal is visible from both the front and rear, as at the left, vertical edge of the windshield. On many closed vehicles the bracket 4 may be bolted to one of the front, left door hinges.

An arm 5 is connected to the bracket 4 by a suitable ball joint 6. This arm supports a small electric motor 7 and a cylindrical casing 8 for the signal mechanism. On the rear face of the casing I prefer to place a rear view mirror 9. The ball joint 6 facilitates focusing the rear view mirror 9. When the position of the mirror has been adjusted it may be secured in adjusted position by means of a set screw 6a. A rear wall 10 of the casing 8 is sufficiently rigid to support the signal mechanism and has fixed thereon at the axis of the casing a stud 11 on which a large spur gear 12 is journaled. The teeth at the outer periphery of this gear mesh with a driving pinion 13 fixed on the shaft 14 of the motor 7. A short shaft 15 has a bearing eccentrically located on the gear 12 and fixed on this shaft at the front or outer face of the gear 12 is an arm 16 carrying a signal 17. This signal is preferably of the type having prismatic reflecting surfaces at the front and rear and is colored red to attract attention.

Fixed on the inner end of the shaft 15 is a pinion 18 adapted to be actuated to extend and retract the signal 17 and meshing with the pinion 18 is a gear segment 19 integral with an arm 20. This arm is pivoted on a pin 21 carried by the gear 12 and its movement in one direction is limited by a stop pin 22 and in the other direction by the hub of the gear 12. The signal 17 is normally retracted, as indicated in dotted lines in Fig. 2, by a coiled spring 23 which has one end secured to the arm 20 and the other end secured to a pin 24 projecting from the inner face of the gear 12.

To actuate the signal 17 to its extended, operative position a solenoid 25 is mounted on the gear 12 and has a plunger 26 connected to the arm 20 by a link 27. As shown in Fig. 2, electric current is supplied to the solenoid 25 through a ring 28 mounted on the front face of the casing wall 10 and a brush 29 resiliently engaging said ring. The ring 25 and brush 29 are in circuit with the vehicle battery and solenoid respectively and one side of the circuit may be grounded through the casing and bracket supporting the signal. The motor 7 is of the reversible type and is also in circuit with the vehicle battery under control of a three-way switch 30, as indicated in Fig. 3. In this diagrammatic illustration the vehicle battery is indicated by the numeral 31 and the field coil of the motor by the numeral 32. In the open position of the switch 30 it will be evident that the solenoid and motor are inoperative, while in one of the other positions the motor is operated in a clockwise direction and in the third position in counter-clockwise direction, the solenoid being energized whenever the motor is in operation.

The spring 23 normally retains the signal 17 in its retracted position indicated in dotted lines in Figs. 1 and 2, the arm 20 being held against the stop pin 22 while the gear segment 19 retains the pinion 18 on the shaft 15 in the retracted position. To indicate a turn the driver of the vehicle merely operates the switch 30 in the appropriate direction to start the motor 7 and simultaneously energize the solenoid 25. The operation of the motor continues until the switch 30 is opened and when in operation causes the gear 12 to be driven through the pinion 13 and thereby impart continuous movement to the signal 17 around the outer periphery of the casing 8. Energization of the solenoid 25 causes the plunger 26 to be actuated to thereby move the arm 20 against the hub of the gear 12 while the gear segment 19 turns the pinion 18 to extend the signal 17, as indicated in full lines in the drawing. The signal 17 remains in extended position as long as the solenoid is energized and is conspicuous by reason of its motion. It indicates by its direction of motion the direction that the driver intends to turn the vehicle. As viewed from the front, clockwise movement of the signal 17 indicates a left turn while counterclockwise movement indicates a right turn. To stop the signal the switch 30 is moved to its central or neutral position. This de-energizes the motor and solenoid and the spring 23 immediately retracts the signal 17 to its dotted line position where it is concealed from the rear and inconspicuous when viewed from the front of the vehicle.

Having described my invention, what I claim as new and desire to protect by Letters Patent is:

1. A direction indicator comprising, a rotary member, a signal, means connecting said signal to said rotary member and permitting said signal to be extended beyond the periphery of said member and to be retracted in parallel relation thereto power-driven means for rotating said member continuously when the signal is extended and means for extending and retracting said signal to display the same when extended.

2. A direction indicator comprising, a rotary member, a signal carried by said member to rotate therewith, means connecting said signal to said rotary member and permitting said signal to be extended beyond the periphery of said member and to be retracted in parallel relation thereto, power-driven means for rotating said member in clockwise and counter-clockwise directions when the signal is extended and means for extending and retracting said signal to display the same when extended, the direction of turn being indicated by the direction of rotation of said signal when extended.

3. In a direction indicator for vehicles, a substantially cylindrical casing, a rotary member mounted in said casing, a signal movably mounted on said rotary member, said signal being extensible to project from and adjacent to the outer periphery of said casing, power-driven means for rotating said member and means for extending and retracting said signal on said member.

4. A direction indicator for vehicles comprising, a spur gear, a signal mounted on said gear, means connecting said signal to said gear and permitting movement of said signal in a plane parallel thereto and to project from and adjacent to the periphery thereof and power-driven means for rotating said gear in clockwise and counter-clockwise directions to indicate turns by the direction of rotation of said signal around the periphery of said gear.

5. A direction indicator for vehicles comprising, a substantially cylindrical casing, a spur gear mounted for rotation coaxially in said casing, a motor, means operatively connecting said motor to said gear and a signal mounted eccentrically on said gear to project beyond the periphery of said casing and to indicate the direction of a turn by its direction of rotation around said casing.

6. A direction indicator for vehicles comprising, a substantially cylindrical casing, a spur gear mounted coaxially in said casing, a motor, means operatively connecting said motor to said gear, a signal mounted on said gear and arranged to be retracted adjacent to a face thereof and to be extended from the periphery of said casing and means for extending and retracting said signal.

7. A direction indicator comprising, a casing, a member mounted for rotation in a vertical plane in said casing, a shaft mounted eccentrically on said member, a signal secured to said shaft at a point removed from the center of said signal, a pinion for actuating said signal secured to said shaft, said casing having an opening permitting said signal to project therefrom, a gear segment mounted on said rotary member and engaging said pinion to turn said shaft and power-driven means for continuously rotating said member and for actuating said gear segment, the direction of a turn being indicated by the direction of rotation of said signal when extended from said rotary member.

WILLIAM P. MacMICKING.